United States Patent [19]

Mizuno

[11] Patent Number: 4,607,335
[45] Date of Patent: Aug. 19, 1986

[54] APPARATUS FOR PERFORMING TRANSACTIONS WITH VERIFICATION OF REMITTANCE THROUGH COMPARISON WITH LOGICAL PAYMENT PATTERNS

[75] Inventor: Shinichiro Mizuno, Ibaraki, Japan

[73] Assignee: Omron Tateisi Electronics Co., Kyoto, Japan

[21] Appl. No.: 560,820

[22] Filed: Dec. 13, 1983

[30] Foreign Application Priority Data

Dec. 14, 1982 [JP] Japan .................... 57-219943

[51] Int. Cl.$^4$ .................... G07G 1/00; G06F 15/21
[52] U.S. Cl. .................... 364/405; 364/404; 235/7 A; 235/379
[58] Field of Search ........... 364/405, 404; 235/379, 235/381, 7 A

[56] References Cited

U.S. PATENT DOCUMENTS

| | | | |
|---|---|---|---|
| 3,946,217 | 3/1976 | Tsujikaw | 364/405 |
| 4,166,945 | 9/1979 | Inoyoma | 235/379 |
| 4,322,796 | 3/1982 | Uchida et al. | 364/405 |
| 4,389,707 | 6/1983 | Tsuzuki | 364/405 |
| 4,435,767 | 3/1984 | Nakatani et al. | 364/405 |

FOREIGN PATENT DOCUMENTS

| | | | |
|---|---|---|---|
| 2554270 | 6/1977 | Fed. Rep. of Germany | 364/405 |
| 54-842 | 6/1979 | Japan | 364/405 |
| 55-83956 | 6/1980 | Japan | 364/405 |
| 55-95140 | 7/1980 | Japan | 364/405 |
| 55-118176 | 9/1980 | Japan | 364/405 |
| 55-118175 | 9/1980 | Japan | 364/405 |

*Primary Examiner*—Jerry Smith
*Assistant Examiner*—Charles B. Meyer
*Attorney, Agent, or Firm*—Schwartz, Jeffery, Schwaab, Mack, Blumenthal & Evans

[57] ABSTRACT

The invention is embodied, for example, as an electronic cash register (ECR). The ECR is at least provided with numerical keys and a buzzer. When data relating to the prices of goods to be registered is entered with use of the numerical keys, the total sum payable by the customer is calculated and stored in a memory. When a sum received is entered with use of the numerial keys, the sum is similarly stored in the memory. The ECR has a CPU which compares the received sum keyed in with a pattern predetermined based on data relating to the kinds of money in circulation and checks whether the received sum is acceptable relative to the total sum. The buzzer goes on when the received sum is not acceptable.

17 Claims, 7 Drawing Figures

| TOTAL SUM STORING AREA G | | KEYED-IN RECEIVED SUM STORING AREA A | | KINDS OF CURRENCY STORING AREA C | | | |
|---|---|---|---|---|---|---|---|
| G7 | 0 | A7 | 0 | C7 | 1 | | |
| G6 | 0 | A6 | 0 | C6 | 1 | | |
| G5 | 0 | A5 | 0 | C5 | 1 | | |
| G4 | 0 | A4 | 1 | C41 | 1 | 5 | C42 |
| G3 | 1 | A3 | 0 | C31 | 1 | 5 | C32 |
| G2 | 2 | A2 | 2 | C21 | 1 | 5 | C22 |
| G1 | 5 | A1 | 5 | C11 | 1 | 5 | C12 |

POINTER
i

FLAG
F

| TOTAL SUM STORING AREA G | | KEYED-IN RECEIVED SUM STORING AREA A | | KINDS OF CURRENCY STORING AREA C | | |
|---|---|---|---|---|---|---|
| G7 | 0 | A7 | 0 | C7 | 1 | |
| G6 | 0 | A6 | 0 | C6 | 1 | |
| G5 | 0 | A5 | 0 | C5 | 1 | |
| G4 | 0 | A4 | 1 | C41 | 1  5 | C42 |
| G3 | 1 | A3 | 0 | C31 | 1  5 | C32 |
| G2 | 2 | A2 | 2 | C21 | 1  5 | C22 |
| G1 | 5 | A1 | 5 | C11 | 1  5 | C12 |

POINTER: i

FLAG: F

23

ENTER
↓
TOTAL SUM CALCULATION — 31
↓
TOTAL SUM → G — 32
↓
DISPLAY — 33
↓
RETURN

APPARATUS FOR PERFORMING TRANSACTIONS WITH VERIFICATION OF REMITTANCE THROUGH COMPARISON WITH LOGICAL PAYMENT PATTERNS

BACKGROUND OF THE INVENTION

1. Field of the Invention

The present invention relates to an apparatus for performing transactions such as an electronic cash register or bank machine.

2. Related Art

Many electronic cash registers (ECR's) are adapted to calculate change. The operator first keys in the price values of goods purchased by the customer, whereupon the total sum is calculated. The operator then keys in the sum of cash given by the customer (received sum). The ECR automatically calculates the change (received sum minus total sum) and displays the sum of the change. With reference to the sum displayed, the operator returns the change to the customer.

With such an ECR, the operator must always key in the sum received. Entering received sums invariably involves the likelihood of errors where large quantities of sales must be handled promptly. For example, when the customer offers 10200 yen to the operator in payment of 6200 yen, the operator is likely to incorrectly key in 12000 yen as the received sum. The change will then be shown as 5800 yen instead of 4000 yen, and if the operator believes in this value and gives 5800 yen to the customer, the store will suffer a loss of 1800 yen. Thus the conventional ECR has the drawback of executing transactions improperly owing to the operator's keying-in errors, whereas if it is attempted to manipulate the keys accurately, a reduced keying-in speed will result in lower efficiency.

SUMMARY OF THE INVENTION

An object of the present invention is to provide a standard apparatus for performing transactions which is adapted to calculate change when the sum received is keyed in by the operator and to automatically give notice to the operator when the received sum keyed in is not acceptable relative to the total sum so as to assure accurate transactions without entailing a reduced efficiency.

According to the present invention, attention is directed to the fact that the sum offered by the customer in payment of a certain total sum is patterned in conformity with a definite rule. For example, when the total sum is 125 yen, it is likely that the customer will offer (i.e., the operator will receive) a 1000 yen bill, a 5000 yen bill or a 10000 yen bill, but the customer is generally unlikely to offer two or three 1000 yen bills. Further in payment of the same total sum, the customer is likely to offer 1025 yen or 10025 yen but is almost unlikely to pay 2025 yen. Accordingly, when usual patterns of received sums are preset for total sums in view of such a rule, the received sum can be checked for the possible keying-in error by comparing the keyed-in sum with such patterns.

The apparatus of the present invention for performing transactions is characterized in that it comprises means for generating a total sum, means for storing the total sum generated, means for generating a received sum, means for storing the received sum generated, means for storing data relating to the kind of money, means for comparing the received sum stored with a pattern of acceptability of received sums relative to total sums which pattern is predetermined based on the data, and means for informing that the received sum stored is not included in the acceptability pattern, based on the result of comparison.

When the present invention is embodied as an ECR, the total sum generating means comprises numerical keys for entering sums relating to goods and means for calculating the total of keyed-in sums. The received sum generating means will also comprise numerical keys.

The present invention can be embodied also as a teller machine (bank machine) to be operated by the teller at the bank. When operating the machine for performing transactions, the teller enters sums of deposits, sums payable, sums to be transferred, transfer handling charges, etc. The transfer handling charges will be stored in the machine in advance. When a deposit, payment, transfer and like transactions are to be performed in sequence for a customer, the teller machine calculates the sum to be eventually received from the customer. The teller further keys in the sum received from the customer, whereupon the change to be given to the customer is calculated. Accordingly, the total sum generating means includes means for calculating the sum to be eventually received from the customer for one of deposit, payment and transfer transactions or for the combination of such transactions, and the received sum generating means comprises numerical keys.

If the received sum is found unacceptable relative to the total sum, this is automatically informed by the machine of the invention, so that the machine has the advantage that the received sum can be entered by the operator or teller with less attention than heretofore needed. Consequently the machine can be operated more easily and quickly to handle transactions with improved accuracy and enhance the reliability of the store. Because entering errors are avoidable, accounts can be settled with greater ease.

DESCRIPTION OF THE PREFERRED EMBODIMENT

An ECR embodying the present invention will be described.

Figure 1:
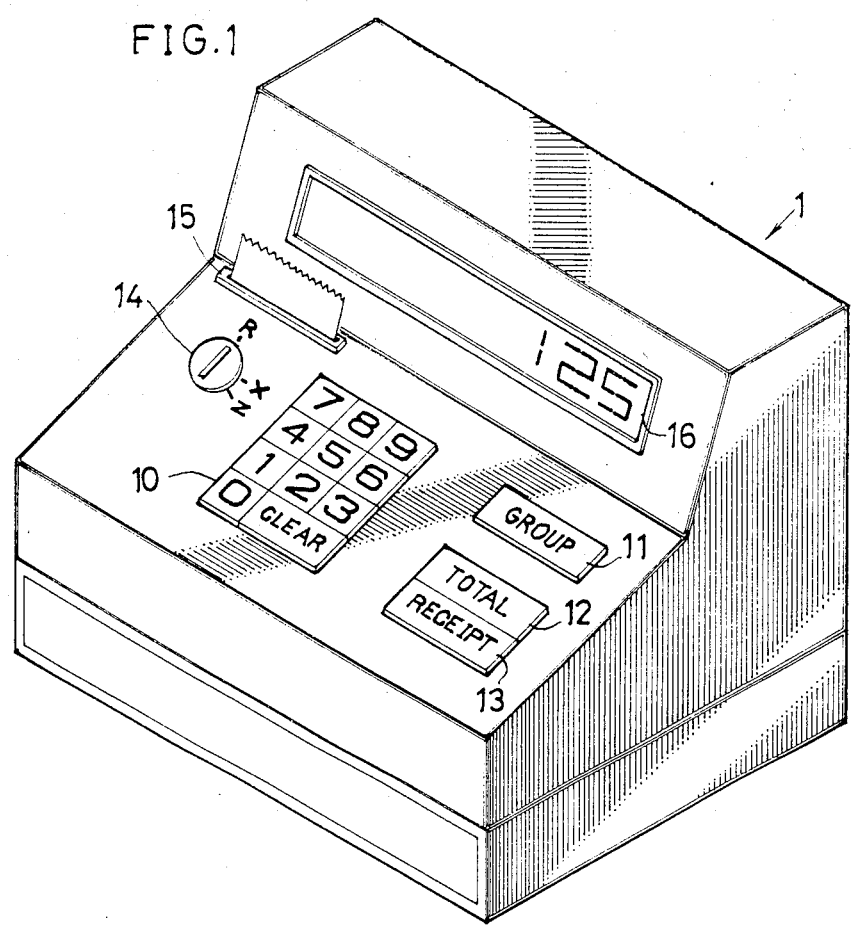
FIG. 1 is a perspective view showing the appearance of an ECR.

FIG. 1 shows the appearance of the ECR. The groups of keys on an operation panel of the ECR 1 are shown as simplified and limited to a minimum necessary for describing the present invention. The control panel has a ten-key arrangement 10 including a clear key, various function keys and a mode change key switch 14. The ten-key arrangement 10 is used for entering the prices (unit prices) of goods, received sums, etc. With the present embodiment, the function keys include a group key 11, total key 12 and receipt key 13. The mode change key switch 14 is adapted to select one of a register mode R, inspection mode X and settlement mode Z. The ECR is further provided with a display 16 and a printer 15. The display 16 shows sums entered by the ten-key arrangement 10 and total sums calculated. The printer 15 prints details of transaction data for every transaction in the register mode R, inspection data in the inspection mode X and settlement data in the settlement mode Z.

Figure 2:
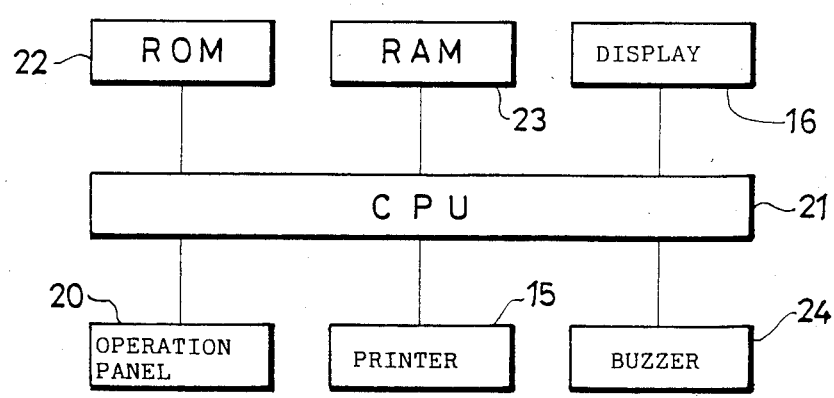
FIG. 2 is a block diagram generally showing the electrical construction of the ECR.

FIG. 2 generally shows the electrical construction of the ECR. The operation panel 20 includes the foregoing keys 10 to 13, and mode key change switch 14. A CPU 21 executes a usual process for each mode selected and checks whether the received sum keyed in is acceptable relative to the total sum concerned as will be described later. The CPU 21 is connected to the printer 15 and the display 16 and also to a buzzer 24 for giving an alarm when detecting that the received sum is unacceptable. A flickering pilot lamp may alternatively be used as the alarm generating means. A ROM 22 has stored therein a program for the CPU 21. A RAM 23 is adapted to store various items of data.

Figures 3, 4:
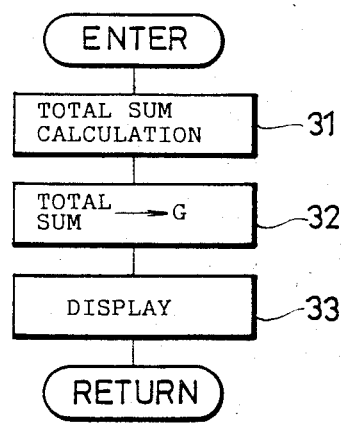
FIG. 3 partly shows a RAM.
FIGS. 4, 5, 6a and 6b are flow charts showing processes to be executed by a CPU within the ECR.

FIG. 3 shows part of the RAM 23 which is internally provided with an area G for storing a total sum, an area A for storing a received sum keyed in, an area C for storing the kinds of currencies, a pointer and a flag. These areas have seven storage locations represented by $G_i$, $A_i$, and $C_i$ or $C_{i1}$ or $C_{i2}$ wherein i is 1 to 7 and represents digit positions of decimal numbers. The pointer serves to specify these digit positions (addresses of the storage locations). The flag F serves to store the result of checking of the received sum for acceptability. If the sum is acceptable, it is set to 1, while if otherwise, it is reset to 0. It is seen in FIG. 3 that a total sum of 125 yen calculated is stored in the area G and that a received sum of 1025 yen keyed in is stored in the area A. In this way, the values of the digits of the total sum and the received sum are stored in the storage locations of the areas G and A. The kinds of money presently in circulation in Japan are 1 yen, 5 yen, 10 yen, 50 yen, 100 yen (all coins); 500 yen (coin and bill); 1000 yen, 5000 yen and 10000 yen (all bills). For sums of up to four digits (i=4), two kinds of money are present for each digit, so that the corresponding storage locations in the area C are divided into two; i.e., $C_{i1}$ and $C_{i2}$. Of the two values representing the kinds of money of each digit, the smaller value (unit) 1 is stored in the location $C_{i1}$, and the larger value (unit) 5 is stored in the location $C_{i2}$. In the location C5, the value (unit) for 10000 yen, i.e., 1, is stored. The values (units) 1 in the locations C6 and C7 are assumed for 100000 yen and 1000000 yen. Although these two kinds of money are not present, 1 is set for each of nonexisting 6-digit and 7-digit currencies to simplify the process to be described later (FIG. 6a, steps 55 to 58). 0 an be set in these locations C6 and C7.

In the following description, the values stored in the locations $G_i$, $A_i$, $C_i$ of the areas G, A, C will be represented by $(G_i)$, $(A_i)$, $(C_i)$.

In the simplest mode, the keys on the ECR are manipulated by the operator in the following manner. Entering of the price of a commercial article by the ten-key arrangement 10→depression of the group key 11→(these steps are repeated when many articles are purchased)→depression of the total key 12 (whereby the total sum is calculated and shown on the display 16, whereupon the customer gives cash to the operator for payment)→entering the sum received (from the customer) by the ten-key arrangement 10→depression of the receipt key 13. (The received sum is checked for acceptability, and the change is calculated within the ECR, thereafter.) Although not stated for the sake of simplified description, the number of the group to which a particular article belongs is usually entered with use of the ten-key arrangement before or after entering the price of the article. Further when a plurality of the same articles are purchased, the unit price of the article and the number will be entered instead of the goods price.

FIG. 4 shows a subroutine to be executed by the CPU 21 when the total key 12 is depressed. First, based on the price of one or more than one article (or unit price and number) already entered, the total sum of sale (purchase) is calculated (step 31). The sum is transferred to and stored in the total sum storing area G of the RAM 23 (step 32). The total sum is further shown on the display (step 33).

Figure 5:
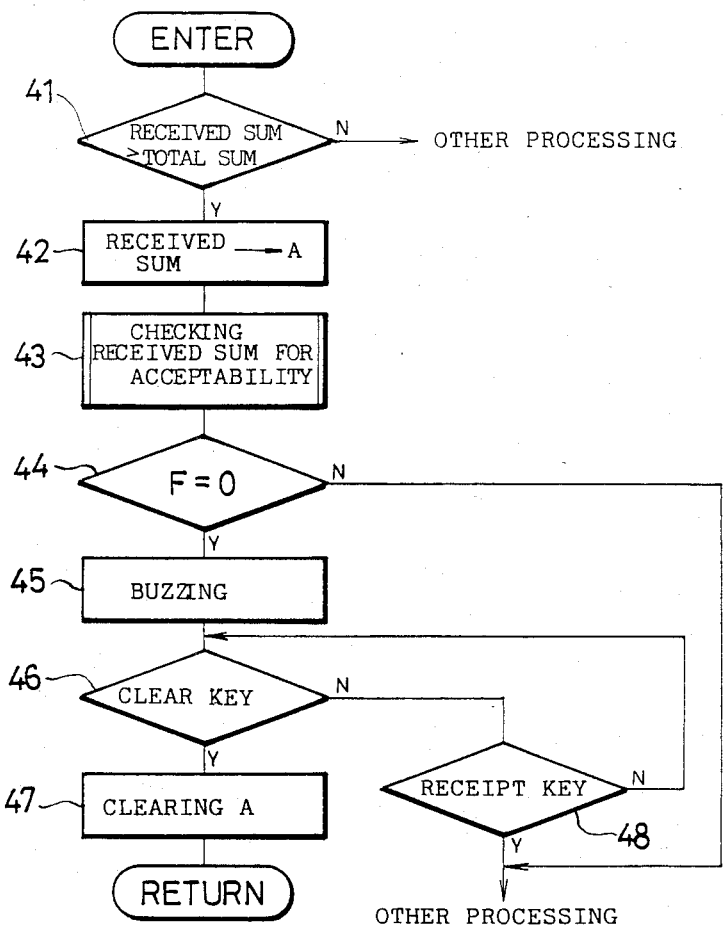

FIG. 5 shows a subroutine to be executed when the receipt key 13 is depressed after the received sum has been entered. It is assumed that the received sum keyed in is temporarily stored in a buffer register in the CPU 21. First, the received sum in the buffer register is compared with the total sum in the area G (step 41). If the received sum is greater than the total sum, the next step 42 follows, but if otherwise, other process follows. For example, when the total sum is equal to the received sum, the sequence proceeds to the step of printing the transaction data. When the received sum is less than the total sum, the received sum must be keyed in again, so that a display to that effect is given. In step 42, the received sum data in the buffer register is transferred to and stored in the received sum storing area A of the RAM 23.

The received sum in the area A is thereafter checked for acceptability (step 43, see FIG. 6). When this step finds the received sum acceptable, the flag F is set to 1. Otherwise, the flag is reset to 0.

Accordingly the flag F is checked (step 44) after the checking step 43. If the flag F is 0, indicating that the received sum is unacceptable, an instruction is given for driving the buzzer 24, whereupon the buzzer 24 goes on (step 45). Unless the flag F is 0, the received sum is acceptable, with the result that the logic sequence proceeds to some other process, for example, calculation of the change.

When the buzzer 24 goes on, the operator checks the input of received sum for the possible error. If an input error is found as indicated by the check result, the operator depresses the clear key in the ten-key arrangement 10 (step 46), whereby the area A is cleared (step 47). Subsequently the operator can re-enter the received sum.

Even when the buzzer 24 goes on because the received sum is found unacceptable, there can be a case where the operator has entered the received sum correctly. This situation arises when the customer has requested an exceptional mode of payment which is usually unlikely. Step 48 is provided for such an exceptional case. The operator depresses the receipt key 13 again (step 48), whereupon the sequence proceeds, for example, to calculation of the change to continuously execute the transaction.

FIG. 6 shows the step 43 of checking the acceptability of the received sum in detail.

Figure 6A:
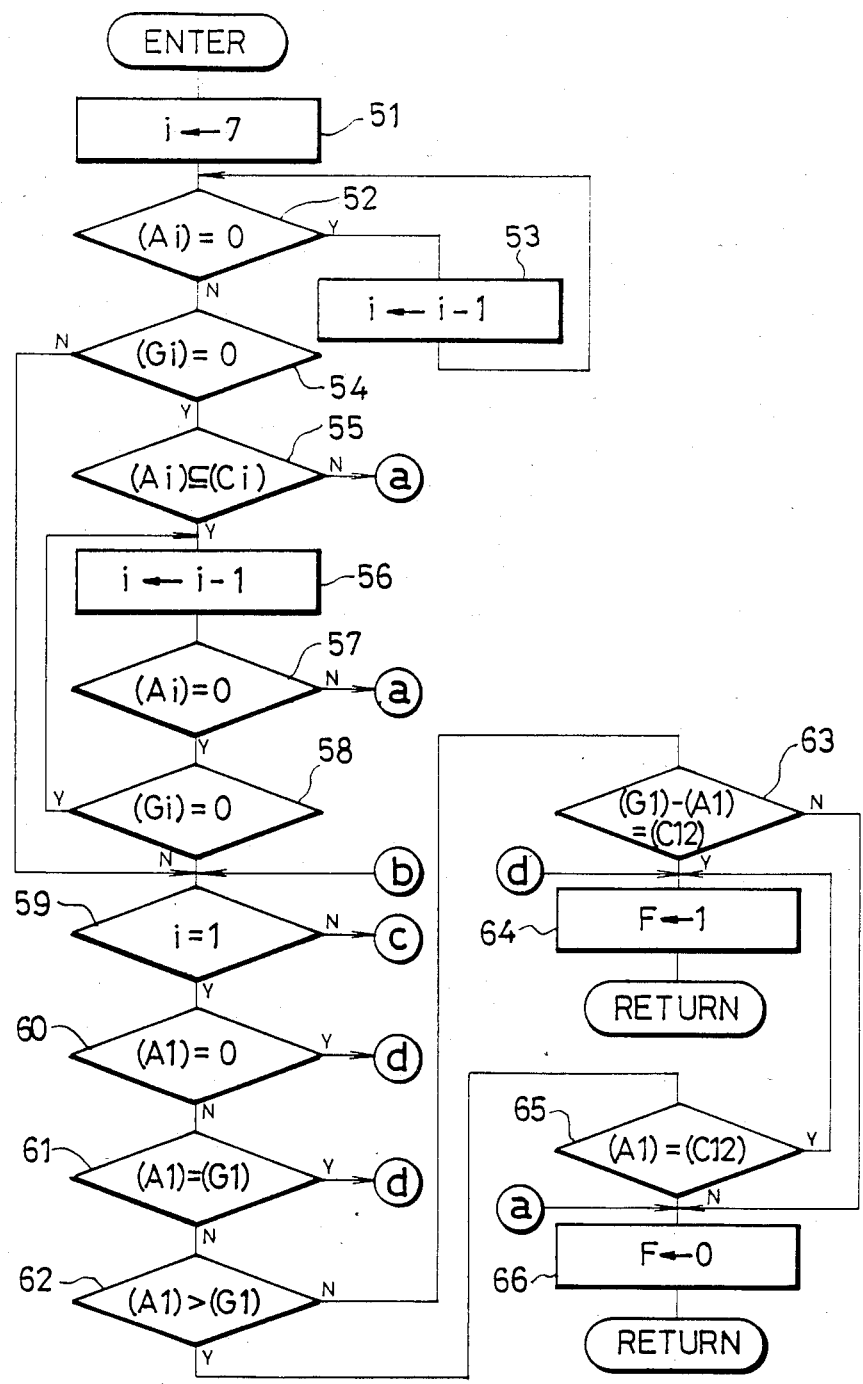

With reference to FIG. 6a, the received sum is first checked as to the number of digits of the sum. The number representing the highest digit position (i=7) is set in the pointer (step 51). The storage location $A_i$ (first, $A_7$) of the area A is specified by the contents i of the pointer, and the value $(A_i)$ stored therein is checked as to whether it is 0 (step 52). If the value $(A_i)$ is 0, the contents i of the pointer are decreased by a decrement 1 (step 53). Step 52 then follows again to specify another storage location Ai by the renewed contents of the pointer and checks whether the value (Ai) stored therein is 0. If the value (Ai) is not 0 (i.e., if it is one of 1 to 9), the digit position i designated by the pointer is the highest digit position of the received sum. When the received sum is 1025 yen, i=4.

The corresponding storage location Gi of the total sum storing area G is then specified by the contents i of the pointer, and the value (Gi) in the location is checked as to whether it is 0 (step 54). If the value (Gi) is 0, this means that the number of digits of the received sum is greater than the number of digits of the total sum. In this case, the sequence proceeds to step 55. If the total sum is 125 yen, (G4) is 0. Thus the number of digits of the received sum 1025 yen is greater than that of the total sum 125 yen. When the value (Gi) is not 0, this means that the number of digits of the received sum is equal to that of the total sum. In this case, step 59 follows.

When the number of digits of the received sum is greater than the number of digits of the total sum, the values at the digit positions of the received sum higher than the digit positions of the total sum are checked for acceptability in steps 55 to 58. When fulfilling the following two requirements, the values of the received sum at the higher digit positions are regarded as acceptable relative to the total sum.

(1) The value at the highest digit position of the received sum is in match with the value (at the same digit position) of the currency having the corresponding number of digits. (Thus, the amount of money at the highest digit position of the received sum must be such that it can be paid with a single bill or coin).

For example, when the received sum is a four-digit value, the value at the fourth digit position (position of thousands) must be 1 or 5 because the four-digit currencies are 1000 yen (with a value 1 at the fourth digit position) and 5000 yen (with 5 at the fourth digit position) only.

The sum is checked as to the requirement (1) in step 55. The contents i of the pointer designate the highest digit position of the received sum. The value (Ai) is checked as to whether it is in match with the value (Ci) (or one of (Ci1) and (Ci2)) of the currency at the same digit position. If a match is found, the sum is then checked as to the next requirement (2). Otherwise, the received sum is not acceptable, so that the flag F is reset to 0 (step 66).

(2) The value of the received sum at the digit position corresponding to the highest digit position of the total sum is 0. Similarly, the values at the digit positions of the received sum between the highest digit position of the total sum and the highest digit position of the received sum are all 0.

In the case where the total sum is 125 yen and the received sum is 1025 yen, the highest digit position of the total sum is the third position (position of hundreds). Since the value in the third position of the received sum 1025 yen is 0, the received sum 1025 yen is acceptable. When the received sum is 10025 yen, the values in the third and fourth digit positions thereof are 0, and the sum is therefore similarly acceptable. If the received sum is 1100 yen, 1125 yen, 11025 yen or 10125 yen for the total sum of 125 yen, these received sums are all unacceptable.

The received sum is checked as to the requirement (2) in steps 56 to 58. The contents i of the pointer show the highest digit position of the received sum. The contents are therefore decreased by a decrement of 1 (step 56), and the value (Ai) of the received sum in the digit position next to and lower than the highest digit position thereof is checked as to whether it is 0 (step 57). When it is 0, the value (Gi) of the total sum in the same digit position is checked as to whether it is 0. If it is not 0, the sequence proceeds to step 59 (step 58). In the case where the total sum is 125 yen and the received sum is 1025 yen, step 58 proves NO. When the received sum is 10025 yen for the total sum of 125 yen, the interrogation of step 58 is answered with YES since the value in the fourth digit position of the total sum is 0. The sequence returns to step 56, in which the contents of the pointer are decreased by a decrement 1. The sequence proceeds from step 58 to step 59 when a digit position of the total sum appears with a value other than 0. Accordingly, when the sequence proceeds from step 58 to step 59, the contents i of the pointer always indicate the highest digit position of the total sum. The pointer also indicates the highest digit position of the total sum when step 54 is directly followed by step 59.

If the answer to the interrogation of step 57 is NO, the requirement (2) is not fulfilled, so that the flag F is reset to 0 (step 66).

Step 59 checks whether the digit position i specified by the pointer is the first position. When it is the first digit position, the sequence proceeds to the process starting with step 60. If it is the second digit position or higher position, the process starting with step 70 is executed (FIG. 6b).

Figure 6B:
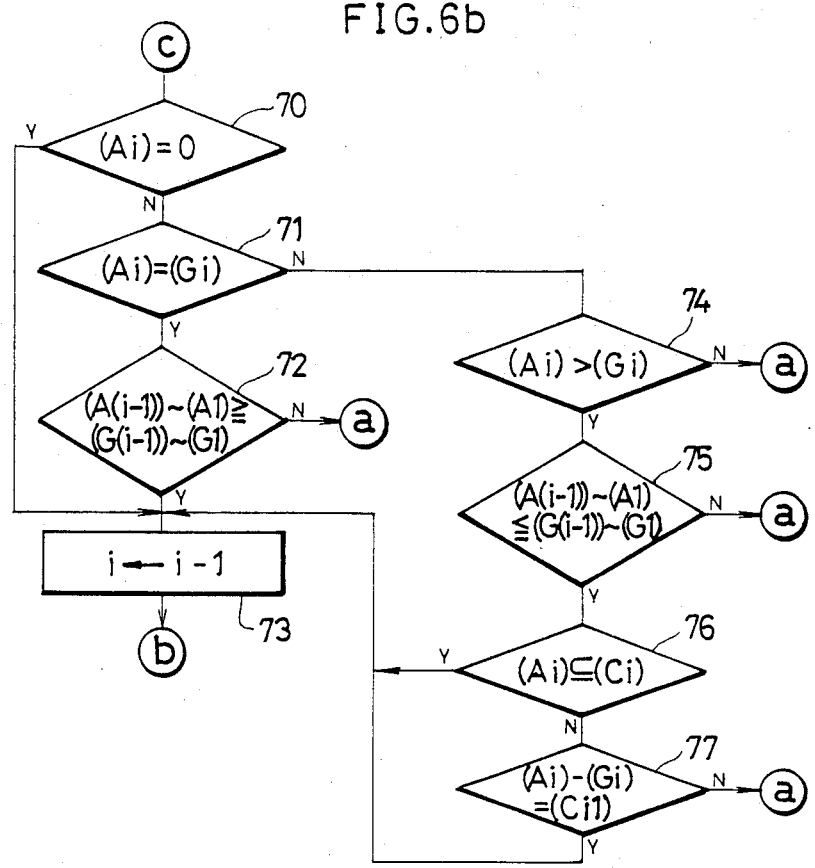

In the process shown in FIG. 6b, the received sum is checked for acceptability at the digit positions not lower than the second position (up to and inclusive of the highest digit position of the total sum). The received sum acceptability pattern (requirements) relating to these digit positions will be described below.

(3) When (Ai)=0, the value (Ai) at the digit position of the received sum is regarded as acceptable unconditionally.

The sum is checked for this requirement in step 70. When the requirement is fulfilled, the contents i of the pointer are decreased by a decrement of 1 to check the next lower digit position (step 73), which is followed by step 59 again.

(4) If $(Ai) \neq 0$, it is required that $(Ai) \geq (Gi)$. Thus, (Ai) must not be less than (Gi).

For example, when the total sum is 1234 yen and the received sum is 2100 yen, (Ai)=2<(Gi)=1 at the fourth digit position (i=4), thus fulfilling the requirement (4). At the third digit position (i=3), however, (Ai)=1<(Gi)=2, failing to satisfy the requirement (4). Consequently the received sum 2100 yen is regarded as unacceptable in respect to the value at the third digit position.

The sum is checked as to this requirement in steps 71 and 74. When (Ai)<(Gi), the flag F is reset to 0 (step 74 is followed by step 66).

(5) When $(Ai)=(Gi)$ and $(Ai) \neq 0$, the value (Ai) at the digit position i of the received sum is regarded as acceptable if $(A(i-1)) \ldots (A1) \geq (G(i-1)) \ldots (G1)$ wherein $(A(i-1)) \ldots (A1)$ represents the sum of the received sum at its digit positions lower than the position i. The same is true of the expression $(G(i-1)) \ldots (G1)$.

For example, when the received sum is 1250 yen for a total sum of 1234 yen, the check result at the third digit position (i=3) indicates that $(A(i-1)) \ldots (A1)=$ $50 < ((G(i-1)) \ldots (G1) = 34$, so that the value 2 at the third digit position of the received sum is regarded as acceptable. The same is true of the case wherein the received sum is 10234 yen. On the other hand, when the received sum is 2230 yen for the same total sum as above, $(A(i-1)) \ldots (A1) = 30 < (G(i-1)) \ldots (G1) = 34$. The received sum is therefore not acceptable. For the same reason, a received sum of 2204 yen is not acceptable.

The sum is checked as to this requirement (5) in step 72. When the requirement (5) is fulfilled, the sequence proceeds to check the value at the next lower digit position. If the requirement is not fulfilled, the flag F is reset to 0.

(6) When $(Ai) < (Gi)$, $(Ai) \neq 0$, both the following two requirements must be fulfilled.

(6)-1 $(A(i-1)) \ldots (A1) \leq (G(i-1)) \ldots (G1)$

For example, when the received sum is 1300 yen or 1304 yen for a total sum of 1234 yen, $(Ai) = 3 > (Gi) = 2$ if $i = 3$. As to the sum at the digit positions lower than the third digit position. $00 < 34$ or $04 < 34$, so that the requirement (6)-1 is fulfilled. However, when the received sum is 1350 yen or 1354 yen, $50 > 34$ or $54 > 34$, so that the requirement (6)-1 is not fulfilled.

The sum is checked for this requirement in step 75.

(6)-2 (Ai) is in match with (Ci) (or with (Ci1) or (Ci1)), or (Ai)−(Gi) is in match with (Ci1).

For example, when the received sum is 1500 yen for a total sum of 1230 yen, $(Ai) = 5 > (Gi) = 2$ if $i = 2$. Further since $(Ai) = 5$ is included in the values (1, 5) at the storage location C3 (i.e., C31, C32), the requirement (6)-2 is fulfilled. When the received sum is 1300 yen and $i = 3$, $(Ai) - (Gi) = 3 - 2 = 1$ is in match with the value 1 at the location C31, with the result that the received sum also fulfills the requirement. These received sums 1500 yen and 1300 yen also satisfy the requirement (6)-1.

Nevertheless, when the received sum is 1600 yen or 1400 yen for the same total sum, it will be understood that the requirement (6)-2 is not fulfilled with $i = 3$.

The received sum is checked for the requirement (6)-2 in steps 76 and 72.

Finally, the acceptability pattern (requirements) for the received sum will be described as to the first digit position ($i = 1$).

(7) When $(A1) = 0$, the value (A1) is acceptable.

The received sum, which has already fulfilled the requirements (1) to (6) as to the values at the digit positions other than the first position, is regarded as acceptable if fulfilling this requirement (7). The flag F is then set to 1 (steps 60 and 64).

(8) When $(A1) = (G1)$, the value (A1) is acceptable.

In this case, the flag F is similarly set to 1 (steps 61, 64).

(9) When $(A1) > (G1)$, (A1) is regarded as acceptable provided that $(A1) = (C12)$.

For example when the received sum is 1235 yen for the total sum of 1234, $(A1) = 5 > (G1) = 4$. Further $(A1) = 5$ is equal to $(C12) = 5$. Thus the value (A1) is regarded as acceptable. If the received sum is 1236 yen, the sum is not acceptable (steps 62, 65).

(10) When $(A1) < (G1)$, (A1) is acceptable provided that $(G1) - (A1) = (C12)$.

For example when the received sum is 1303 yen for a total sum of 1238 yen, $(A1) = 3 < (G1) = 8$. Further $(G1) - (A1) = 8 - 3 = 5$, which is in match with $(C12) = 5$, so that $(A1) = 3$ is regarded as acceptable. If the received sum is 1304 yen, the sum is not acceptable (steps 62, 63).

The process of FIG. 6 merely generally shows an exemplary acceptability pattern for the received sum relative to the total sum. It is possible to prepare a more elaborate pattern with every possible case considered. The pattern, of course, varies according to the data relating to the kinds of money.

What is claimed is:

1. An apparatus for performing transactions comprising:
    means for generating a total sum,
    means responsive to the generation of the total sum for storing the generated total sum,
    means for generating a received sum,
    means responsive to the generation of the received sum for storing the generated received sum,
    means for previously storing data relating to the kinds of money currently in circulation,
    means responsive to the storing of the total sum and the received sum for comparing the stored received sum with a pattern of acceptability of the received sum relative to the stored total sum, the acceptability pattern being determined based on data relating to the kinds of money and the stored total sum, and
    means in accordance with the result of the comparison performed by said comparing means for informing that the stored received sum is not included in the acceptability pattern.

2. An apparatus as defined in claim 1 which is an electronic cash register, the total sum generating means comprising numerical keys for entering sums relating to goods and means for calculating the total of keyed-in sums, the received sum generating means being keys for entering the received sum.

3. An apparatus as defined in claim 1 which is a bank machine, the total sum generating means including means for calculating the sum to be eventually received from the customer for one of deposit, payment and transfer transactions or for the combination thereof, the received sum generating means comprising numerical keys.

4. An apparatus as defined in claim 1 wherein the total sum generating means comprises numerical keys and means for obtaining the total of numerical values keyed in.

5. An apparatus as defined in claim 1 wherein the total sum generating means comprises numerical keys and means for obtaining the total of a numerical value keyed in and a predetermined numerical value.

6. An apparatus as defined in claim 1 wherein the total sum generating means comprises numerical keys, addition and subtraction instructing keys and means for subjecting numerical values keyed in by the numerical keys to addition or subtraction in response to an instruction given by the addition or subtraction instructing key.

7. An apparatus as defined in claim 1 wherein the received sum generating means comprises numerical keys.

8. An apparatus as defined in claim 1 wherein the received sum is checked for acceptability after the total sum and the received sum have been established.

9. An apparatus as defined in claim 1 wherein a key is provided for instructing the start of the checking of the acceptability of the received sum.

10. An apparatus as defined in claim 1 wherein the informing means is a buzzer.

11. An apparatus as defined in claim 1 which comprises means for calculating change by subtracting the total sum from the received sum.

12. An apparatus as defined in claim 1 which is provided with a clear key and wherein when the received sum is found to be unacceptable, the received sum is cleared from the storing means in response to an instruction from the clear key.

13. An apparatus as defined in claim 1 which is provided with a transaction continuing key and wherein even when the received sum is found unacceptable, an input of the continuing key permits continuation of the transaction.

14. An apparatus as defined in claim 1 wherein the information means is a pilot lamp.

15. An apparatus as defined in claim 1 wherein the informing means is a speech generating means.

16. An apparatus as defined in claim 1 wherein the informing means is a display.

17. An apparatus as defined in claim 1 including means for checking the received sum for the number of digits entered and for determining if the received sum is equal to, is less than or exceeds the number of digits of the total sum.

* * * * *